US009251466B2

(12) United States Patent
Rajesh (10) Patent No.: US 9,251,466 B2
(45) Date of Patent: *Feb. 2, 2016

(54) DRIVING AN INTERACTIVE DECISION SERVICE FROM A FORWARD-CHAINING RULE ENGINE

(71) Applicant: International Business Machines Corporation, Armonk, NY (US)

(72) Inventor: Rao Rajesh, Milton, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,417

(22) Filed: Jul. 16, 2014

(65) Prior Publication Data

US 2015/0142703 A1    May 21, 2015

Related U.S. Application Data

(63) Continuation of application No. 14/082,121, filed on Nov. 16, 2013.

(51) Int. Cl.
| | | |
|---|---|---|
| G06F 17/00 | (2006.01) | |
| G06F 17/20 | (2006.01) | |
| G06N 5/02 | (2006.01) | |
| H04L 29/08 | (2006.01) | |

(52) U.S. Cl.
CPC ................ *G06N 5/027* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 5,517,405 | A | | 5/1996 | McAndrew et al. |
| 7,194,442 | B1 * | | 3/2007 | Flanagan ............. G06Q 50/188 705/80 |
| 7,962,405 | B2 * | | 6/2011 | Sgaraglio et al. ............... 705/39 |
| 7,971,180 | B2 * | | 6/2011 | Kreamer ................ G06Q 10/06 717/101 |
| 8,006,223 | B2 * | | 8/2011 | Boulineau ................. G06F 8/20 705/7.22 |
| 8,032,404 | B2 * | | 10/2011 | Lee ................ G06Q 10/063118 705/7.17 |
| 8,055,606 | B2 * | | 11/2011 | Kreamer ................ G06Q 10/06 705/7.12 |
| 8,108,422 | B2 * | | 1/2012 | Anderson et al. ............. 707/770 |
| 8,271,401 | B2 | | 9/2012 | Arena et al. |
| 8,290,806 | B2 * | | 10/2012 | Lee ................ G06Q 10/063118 705/348 |
| 8,392,982 | B2 * | | 3/2013 | Harris ..................... H04L 63/08 709/203 |
| 8,667,575 | B2 * | | 3/2014 | Thakur ................... G06F 21/41 726/12 |
| 8,782,755 | B2 * | | 7/2014 | Harris ..................... H04L 63/08 718/100 |

(Continued)

OTHER PUBLICATIONS

Using Inductive Reasoning to Find the Cause of Process Delays Vasilyev, E.; Ferreira, D.R.; Iijima, J. Business Informatics (CBI), 2013 IEEE 15th Conference on Year: 2013 pp. 242-249, DOI: 10.1109/CBI.2013.41 Referenced in: IEEE Conference Publications.*

(Continued)

*Primary Examiner* — Michael B Holmes
(74) *Attorney, Agent, or Firm* — Joseph J. Petrokatis; Gregory K. Goshorn; Greg Goshorn, P.C.

(57) ABSTRACT

Disclosed techniques include generating a plurality of questions, each question based upon one or more conditions of a plurality of conditions, wherein the plurality of conditions are generated a plurality of business rules associated with a forward changing rule engine; identifying, as a side effect of evaluating the plurality of business rules for outcome data, missing information corresponding to the plurality of questions; and selecting, for presentation to a user, a first question of the plurality of questions to elicit the missing information from the user.

7 Claims, 8 Drawing Sheets

(56) References Cited

U.S. PATENT DOCUMENTS

| | | | |
|---|---|---|---|
| 8,844,040 B2* | 9/2014 | Harris | H04L 63/08 |
| | | | 713/151 |
| 2005/0055321 A1 | 3/2005 | Fratkina et al. | |
| 2007/0143127 A1 | 6/2007 | Dodd et al. | |
| 2011/0010202 A1 | 1/2011 | Neale | |
| 2011/0106731 A1 | 5/2011 | Pearson et al. | |

OTHER PUBLICATIONS

Mobile information and consultation support system (MICSS): a new m-business service Jalili-Kharaajoo, M. Information and Communication Technologies: From Theory to Applications, 2004. Proceedings. 2004 International Conference on Year: 2004 pp. 91-92, DOI: 10.1109/ICTTA.2004.1307629 Referenced in: IEEE Conference Publications.*

Locational choice modelling using fuzzy decision tables Wets, G.; Witlox, F.; Timmermans, H.; Vanthienen, J. Fuzzy Information Processing Society, 1996. NAFIPS., 1996 Biennial Conference of the North American Year: 1996 pp. 80-84, DOI: 10.1109/NAFIPS.1996. 534708 Referenced in: IEEE Conference Publications.*

Ocean observatories and social computing: Potential and progress Owens, D.; Best, M.; Guillemot, E.; Jenkyns, R.; Pirenne, B. Oceans 2010 Year: 2010 pp. 1-9, DOI: 10.1109/OCEANS.2010.5664303 Referenced in: IEEE Conference Publications.*

"Flex Dynamic Questionnaire," publiched by RIAgora, downloaded from <http://www.riagora.com/2010/11/flex-dynamic-questionnaire> on Nov. 15, 2013, copyrighted 2013.

"Knowledge Automation Expert System Technology," published by Exsys, downloaded from <http://www.exsys.com/exsyscorvid.html> on Nov. 15, 2013, copyrighted 2011.

Cai, "Develop dynamic forms using WebSphere Operational Decision Management v7.5," published by IBM, downloaded from <http://www.ibm.com/developerworks/bpm/library/techarticles/1210_cai/1210_cai.html> on Nov. 15, 2013, Oct. 3, 2012.

"Selecting at Least One Predefined Workflow Based on an INteration with a User,"IP.com Prior Art Database Technical Disclosure, Apr. 20, 2009.

* cited by examiner

DRIVING AN INTERACTIVE DECISION SERVICE FROM A FORWARD-CHAINING RULE ENGINE

CROSS-REFERENCES TO RELATED APPLICATIONS

The present application is a continuation and claims the benefit of the filing date of an application entitled, "Driving an Interactive Decision Service From a Forward-Chaining Rule Engine" Ser. No. 14/082,121, filed Nov. 16, 2013, assigned to the assignee of the present application, and herein incorporated by reference

FIELD OF DISCLOSURE

The claimed subject matter relates generally to interactive decision services and, more specifically to techniques for selecting questions within an interactive decision service.

BACKGROUND OF THE INVENTION

Interactive decision services, such as but not limited to self-service kiosks and interactive voice response systems, are defined here as computer applications that involve a human user in an interactive dialog before arriving at a decision. These computer applications need to determine which question or set of questions to ask next, given a partial set of input data. Techniques for determining which question to ask next may range from very simple (for example, a predetermined sequence for a survey) to very complex (for example, when hundreds of complex business policies determine how to handle a refund request based on a number of different factors).

Currently, there are some techniques for addressing the situation. One such technique employs a decision tree like structure for the question flow, encoded in databases and/or procedural code. When this decision tree gets large or complex, a specialized tool may be used, such as FlexRiver's Flex Dynamic Questionnaire. There are rule-based techniques, which may fall into two categories:

1) Expert system shells, such as EXSYS's Corvid, which essentially use rules to build one or more decision trees (logic blocks) and use backward chaining in a depth-first or breadth-first manner to determine questions to ask.

2) Forward-chaining rule based approaches, such as Exsys Corvid's Smart Questionnaire and IBM's Dynamic Forms using WebSphere Operational Decision Management, which use explicit question generation rules. These rules may use positive logic (e.g. If answer to Q1 is A1 and question Q2 has not been answered then ask question Q2) or negative logic (e.g. if answer to question Q1 is A1, then remove Q3 from predetermined question flow).

SUMMARY

Provided are techniques for interactive decision services and, more specifically to techniques for automatically generating next question(s) within an interactive decision service while processing regular business policies. Disclosed techniques include generating a plurality of questions, each question based upon one or more conditions of a plurality of conditions, wherein the plurality of conditions are generated a plurality of business rules associated with a forward changing rule engine; identifying, as a side effect of evaluating the plurality of business rules for outcome data, missing information corresponding to the plurality of questions; and selecting, for presentation to a user, a first question of the plurality of questions to elicit the missing information from the user.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, the techniques discussed above in the Background may be sufficient when a problem domain is simple. However, as the complexity of business rules go up, cracks are exposed. A complex domain is one in which a large number of business policies do not fit compactly into a single decision tree. In fact, a complex domain can be thought of as a number of loosely coupled, partial decision trees; more like an acyclic decision graph. Decision trees may share questions but be otherwise disjoint. Decision trees may also be partial, i.e., there is no guarantee that answering the questions constituting the decision tree will lead to an outcome. In such a case, control needs to shift to another decision tree to continue the question flow. Aforementioned forward chaining approaches do not handle this scenario. Moreover, any approach that attempts to force fit complex business policies into a decision tree has several drawbacks, which include:

1) Difficult to build: building a decision tree representation can require a lot of initial analysis of business policies. Sometimes, there is a natural business ordering to the questions, while at other times, the ordering is ad-hoc. For questions that do not have a natural dependency, a business subject matter expert (SME) may prioritize them. Priority or weightage may be assigned based on a number of factors such as likelihood of the question being relevant, likelihood of the question leading to an outcome, difficulty in answering the question, likelihood of it being present in the input data because of extraction from a data source, etc. However, since the way a decision tree typically captures prioritization is through tree links, the resulting tree can be very complex.

2) Difficult to maintain: a decision tree representation is brittle in that a small change to a business policy can lead to a large change to the decision tree structure. This makes it hard to maintain, especially considering that the ad-hoc policies described in (1) are likely to change over time.

3) Inability to deal with unsolicited, non-sequential data: a decision tree traverses down the tree as it receives answers to questions in the tree. If there is an unsolicited answer (for example when a client extracts it from its data source), the answer can only be used after the decision tree has traversed to the corresponding node. Therefore, even if this unsolicited data is sufficient in arriving at an outcome and no more questions are necessary, the decision tree will continue to ask spurious questions.

4) Difficult to deal with skipped questions: to allow end user to skip a question, the decision tree must explicitly represent SKIPPED as an answer to the question.

A backward chaining approach can use regular business rules to generate rules. However, this approach does not offer a rich selection capability from multiple candidate questions. Therefore, what is needed are techniques for generating questions without sacrificing the natural representation of business rules while offering a rich mechanism for conflict resolution if multiple candidate questions are available. This disclosure explains a novel technique for doing just this— generating questions by a regular forward chaining rule engine without the need for explicit question generation rules while offering rich conflict resolution strategies.

Figure 1:
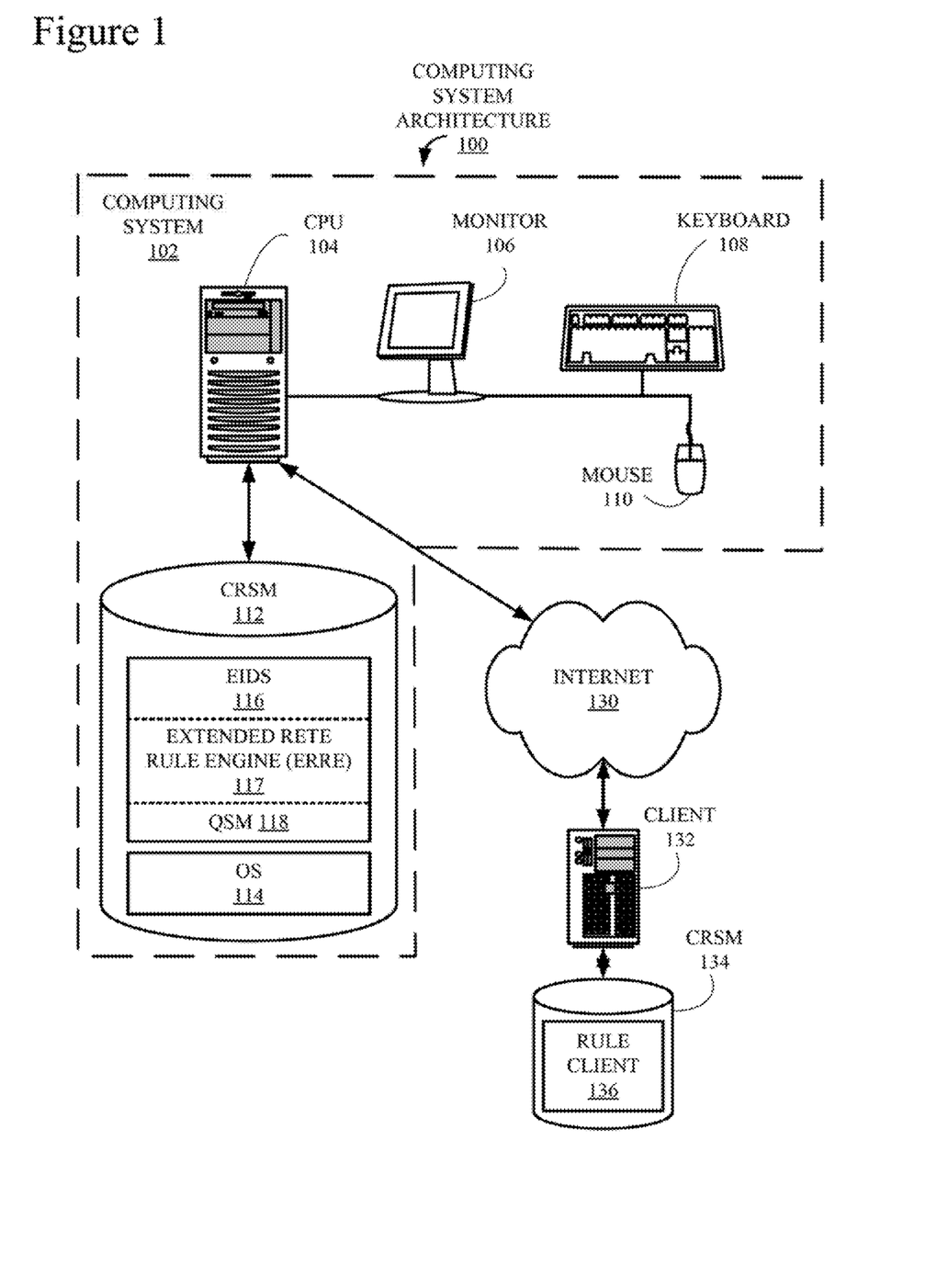
FIG. 1 is a computing system architecture that may support the claimed subject matter.

Turning now to the figures, FIG. 1 is a block diagram of an example of a computing system architecture 100 that may support the claimed subject matter. A computing system 102 includes a central processing unit (CPU) 104, coupled to a monitor 106, a keyboard 108 and a pointing device, or "mouse," 110, which together facilitate human interaction with computing system 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114 and an Extended Interactive Decision Service (EIDS) 116. EIDS 116 includes an Extended Rete Rule Engine (ERRE) 117 and a Question Selection Module (QSM) 118 that implement the claimed subject matter. Although in this example ERRE 117 and QSM 118 are illustrated as included in EIDS 116, ERRE 117 and QSM 118 may also be standalone components that communicate with each other and EIDS 116. It should be noted that a typical computing system may include many applications, but for the sake of simplicity only EIDS 116, ERRE 117 and QSM 118 are shown. Components 116, 117 and 118 represent components of an Enhanced Interactive Decision service that provide a flexible, robust and easily maintained business information service. Components 116, 117 and 118 are described in more detail below in conjunction with FIGS. 2-8.

Computing system 102 and CPU 104 are connected to the Internet 130, which is also connected to a client computing device, or simply "client." 132. Client 132 is coupled to a CRSM 134, which stores logic associated with a rule client 136 that executes on client 132 interacts with EIDS 116 in accordance with the disclosed technology. Although not shown, client 132 would also typically include a CPU, monitor, keyboard and mouse for human interaction Although in this example, computing system 102 and client 132 are communicatively coupled via the Internet 130, they could also be coupled through any number of communication mediums such as, but not limited to, a local area network (LAN) (not shown). Client 132 is used in the following examples as a one possible device from which a user may interact with EIDS 116, ERRE 117 and QSM 118. It should be understood that there are many devices that may enable such access such as, but not limited to, a kiosk, a smart phone, a user terminal and so on. Further, it should be noted there are many possible computing system configurations, of which computing system architecture 100 is only one simple example.

Figure 2:
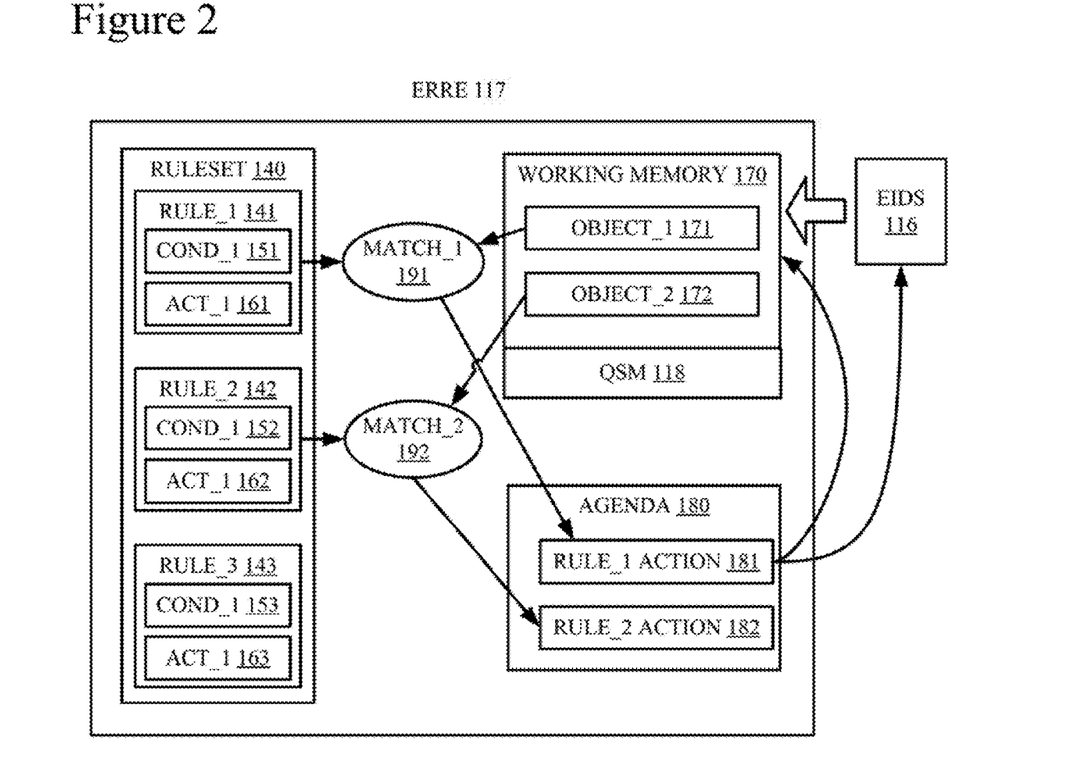
FIG. 2 is a block diagram illustrating high-level operation of an Extended Rete Rule Engine (ERRE), first introduced in conjunction with FIG. 1.

FIG. 2 is a block diagram illustrating high-level operation of ERRE 117, first introduced in conjunction with FIG. 1. ERRE 117 employs forward chaining, of which one particular method is a Rete algorithm. A Rete algorithm is based upon network of nodes in which each node, except a root node, corresponds to a pattern of conditions. A path from the root to a particular node defines a complete set of rule conditions. As a new fact is asserted or modified, it propagates through the network such that the fact is noted at each node in which the fact corresponds to a condition. When all the conditions in a particular rule are satisfied, the corresponding action is triggered.

ERRE 117 receives input, typically in the form of answered questions or the results of actions from rule client 136 (FIG. 1), and is invoked by EIDS 116, first introduced in conjunction with FIG. 1. In this example, ERRE 117 includes a ruleset 140, a working memory 170 and an agenda 180. Ruleset 140 is shown with a few rules, i.e., a rule_1 141, a rule_2 142 and a rule_3 143. It should be understood that ruleset 140 would typically contain more than three rules but for the sake of simplicity only three are shown. Rules 141-143 are each associated with sets of conditions, i.e., a cond_1 151, a cond_2 152 and a cond_3 153, respectively, and a set of actions that are implemented when the corresponding conditions 151-153 are satisfied, i.e., an act_1 161, an act_2 162 and an act_3 163, respectively. Each of conditions 151-153 may have one or more individual conditions.

As answers to questions or the results of actions are received from EIDS 116, the answers and results are entered into working memory 170 and are correlated by QSM 118 (FIG. 1) with domain objects, i.e., an object_1 171 and an object_2 172 in this example. Objects 171 and 172 are correlated with individual conditions (not shown) of conditions 151-153. This is termed as pattern matching in a Rete network. When an object 171 and 172 correspond to a particular individual condition, a match is generated. In this example object_1 171 corresponds to a particular condition of cond_1 151 of rule_1 141, thus generating a match_1 191. In a similar fashion, example object_2 172 corresponds to a particular condition of cond_2 152 of rule_2 142, thus generating a match_2 192. It should be understood that each object may correspond to conditions in multiple rules 141-143. When all the individual conditions of a particular rule 141-143 are satisfied, the corresponding action or actions 151-153 are entered into agenda 180. In this example, cond_1 151 of rule_1 141 is completed and a rule_1 action 181 is entered into agenda 180. Cond_2 152 of rule 141 is also completed and a rule_2 action 182 is also entered into agenda 180. QSM 118 and the generation and interaction of rules, conditions, and actions is explained in more detail below in conjunction with FIGS. 3-8. Simply stated, QSM 118 extends the Rete network processing of ERRE 117 by intercepting the pattern matching activity.

Figure 3:
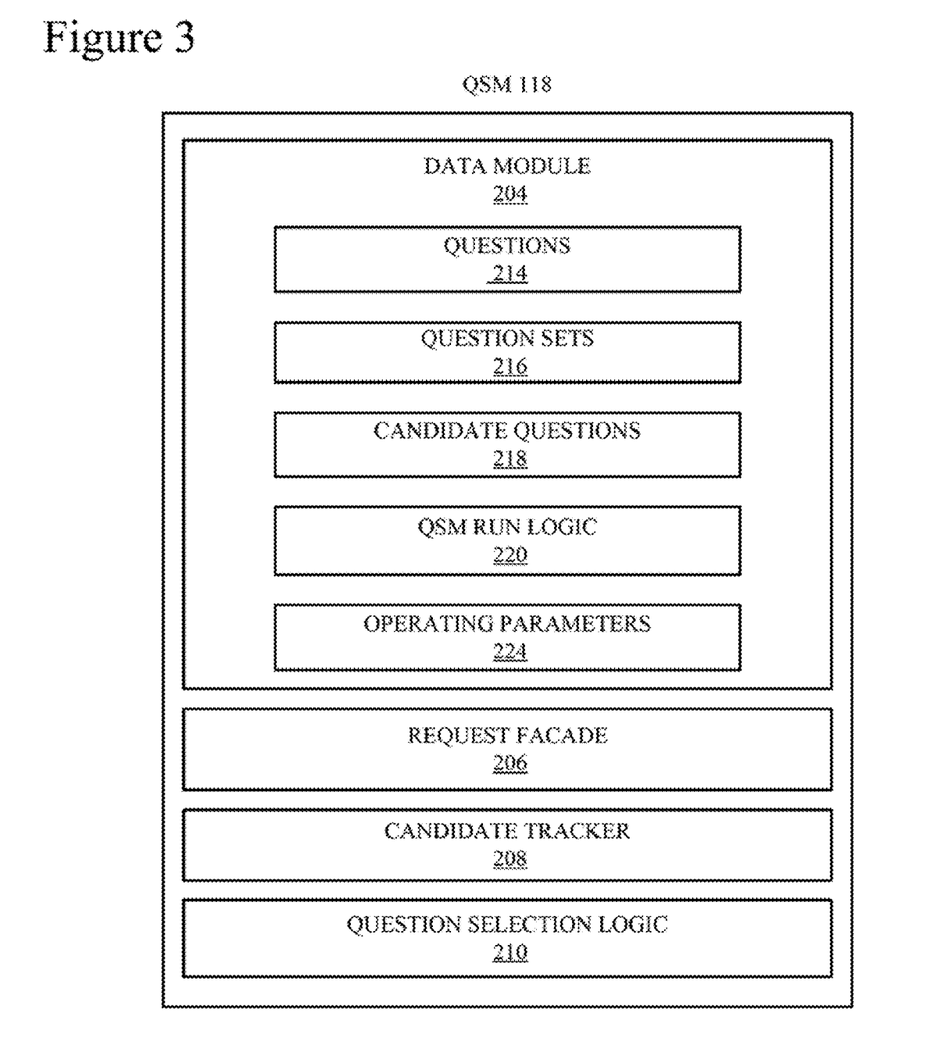
FIG. 3 is a block diagram of a Question Selection Module (QSM) that may implement aspects of the claimed subject matter.

FIG. 3 is a block diagram of QSM 118, first introduced above in conjunction with FIG. 1, in more detail. QSM 118 includes a data module 204, a Request Facade 206, a Candidate Tracker 208 and Question Selection Logic (QSL) 210. For the sake of the following examples, logic associated with QSM 118 is assumed to be stored on CRSM 112 (FIG. 1) execute on one or more processors (not shown) of CPU 104 (FIG. 1) of computer 102 (FIG. 1). It should be understood that the claimed subject matter can be implemented in many types of computing systems and data storage structures but, for the sake of simplicity, is described only in terms of computing system 102 and system architecture 100 (FIG. 1). Further, the representation of QSM 118 in FIG. 3 is a logical model. In other words, components 204, 206, 208 and 210 may be stored in the same or separates files and loaded and/or executed within architecture 100 either as a single system or as separate processes interacting via any available inter process communication (IPC) techniques. For the sake of an example, data module 204 is illustrated as distinct from processing elements 206, 208 and 210 although those with skill in the appropriate arts will appreciate that QSM 118 and ERRE 117 (FIGS. 1 and 2) may be implemented using object-oriented techniques in which data and behavior, or executable logic, are typically combined into objects.

Data module 204 is a data repository for information that QSM 118 requires during normal operation. Examples of the types of information stored in data module 204 include questions 214, question sets 216, candidate questions 218, QSM run logic 220 and operating parameters 224. Questions 214 stores potential questions that may be selected and asked in accordance with the disclosed technology. For the sake of the following examples, seven (7) questions are described, Q1-Q7 511-517 (see FIG. 8).

The following is a table of sample questions that are used as examples in the following description and figures and is representative of information stored in Questions 214:

| Q. NO. | LABEL | TEXT | CHOICES | Q TYPE | S TYPE | WEIGHT |
| --- | --- | --- | --- | --- | --- | --- |
| Q1 | Proof of refund | Do you have proof of refund? | None | Y/N | SS | 1 |
| Q2 | Purchase Amount | What was amount of purchase? | None | DBL. | FF | 1 |
| Q3 | Product Type | What did you purchase? | C3 | TEXT | SS | 1 |
| Q4 | Payment Type | How did you pay? | C1, C2, C3 | TEXT | SS | 1 |
| Q5 | Wearing Suit | Are you wearing a suit? | C4 | Y/N | SS | 0 |
| Q6 | Date of Transaction | When was the transaction? | C2 | DATE | FF | 10 |
| Q7 | Customer's Birthday | Is it your birthday? | C1 | Y/N | SS | 2 |

It should be noted that the questions, and the information stored in conjunction with each question, are listed for the purposes of example only. A typical system would include many more questions and/or, depending upon the application, different questions and information.

In this example, "Question Number" (Q. No.) identifies a particular question, "Label" identifies a question with text, "Text" provides the actual question and "Choices" identifies potential outcomes that might depend upon specific answers (see OC1-4 521-514, FIG. 8). "Question Type" (Q. Type) specifics a particular form that an answer to the corresponding question may take. For example, an answer may be a Yes/No answer (Y/N), a floating point number (DBL.), text (TEXT) or a date (DATE). "Selection Type" (S. Type) further identifies the form that an answer may take. For example, an answer and be "Single_Select" (SS) or "free form" (FF). The "Weight" column associates a numerical weight value to each corresponding question. Although not shown, questions 214 also includes information on reference counts, explained below. Question weights and the selection of particular questions are explained in more detail below in conjunction with FIGS. 4-8.

The following is a table of sample question sets that are used as examples in the following description and figures and is representative of information stored in Question Sets 216:

| QS. NO. | WEIGHT | QUES- TIONS | STATERGY | ALLOW SKIP? |
| --- | --- | --- | --- | --- |
| QS1 | 2 | Q1, Q2, Q4, Q6 | WEIGHTED | TRUE |
| QS2 | 1 | Q1, Q3 | FIRST | FLASE |
| QS3 | 1 | Q1, Q5 | FIRST_IF_NOT_DONE | TRUE |
| QS4 | 4 | Q7 | ALL | FALSE |

Typically, questions are organized into question sets such that each question set is related to a particular business domain or issue. For example, there might be one question set for refund requests, a second set for credit requests and a third to gather demographic data. It should be noted that the described question sets, and the information stored in conjunction with each question set, are listed for the purposes of example only. A typical system would include many more question sets and/or, depending upon the application, different question sets and information.

In this example, "Question Set Number" (QS. No.) identifies a particular question set, "Weight" associates a numerical weight value with each question set and "Questions" specifies the particular questions that are part of the corresponding question set. "Strategy" identifies a particular strategy associated with each question set. For example, "WEIGHTED" specifies that the weights of questions should be employed in calculations to determine the next question, "FIRST" that the first applicable question should be asked, "FIRST_IF_NOT_DONE" that the first applicable question should be asked unless an outcome has already been reached and "ALL" that all applicable questions should be asked. Another possible strategy may include, but is not limited to, "WEIGHTED_MIN/MAX_REF" that specifies the question with the lowest/highest reference count, which is the number of times this candidate is used by the Rete network during pattern matching, should be asked, possibly using weight as a tie-breaker. "SKIP_ALLOWED" specifies whether or not questions may be skipped. The use of the fields of the Question Set table is explained in more detail below in conjunction with FIGS. 3-8.

Candidate questions 218 is employed to keep track of questions that, during processing, are identified as potentially the next question or group of questions to be asked. The identification of particular questions 214 that are included in candidate questions 218 is described in more detail below in conjunction with FIGS. 4-8. QSL run logic 220 stores the logic necessary for the execution of QSM 118. Operating parameters 224 stores user configurable parameters that control the operation of QSM 118. Examples of such parameters include, but are not limited to, the location of log and data files.

Request Facade 206 exposes questions and answers as domain attributes and values, thereby intercepting all pattern matching activity from the Rete network when matching against domain data. Request Facade 206 notifies Candidate Tracker 208 whenever an unanswered question is used by the Rete network. Candidate Tracker 208 tags this as a potential candidate for the next question (Candidate Question). Candidate Tracker 208 keeps track of two dynamic properties of a candidate: 1) the sequence number, or 'ordinal ranking' of this candidate question which indicates the temporal sequence number of this candidate among other candidates and 2) the 'reference count', or the number of times this candidate is used by the Rete network during pattern matching. If during rule processing no outcome is reached, then QSL 210 selects the next question from the set of candidate questions by using these dynamic properties in addition to the static properties such as user-defined weightage associated with the question.

Request Facade 206 handles answers to questions transmitted to ERRE 117. In other words, during the evaluation of rule conditions during Rete processing, ERRE 117 requests from request facade 206 a state of a question and, based upon the data stored in working memory 170 returns an evaluation of the question. For example a question may evaluate to "TRUE," "FALSE" or "NOT EVALUATED." ERRE 117 employs the returned state to evaluate the corresponding condition. Request facade 206 also registers the question with candidate tracker 208, which keeps track of potential next questions to be asked in response to each question. In addition, candidate tracker 208 maintains reference counts (see 551 and 552, FIG. 8) corresponding to each candidate question that indicate how many times a particular question has been used during rule engine processing. Reference counts factor into the disclosed question selection process. Further, candidate tracker 208 is responsible for determining an ordinal ranking corresponding to each candidate question. Ordinal rankings are essentially the ordering of candidate questions in the sequence that are used by ERRE 117 during rule evaluation.

QSL 210 stores logic for the evaluation of question with respect to weights and reference numbers. QSL 210 also selects a next question to present to a user if necessary based upon evaluation of questions in candidate tracker 208. Components 204, 206, 208, 210, 214, 216, 218, 220, 222 and 224 are described in more detail below in conjunction with FIGS. 4-8.

Figure 4:
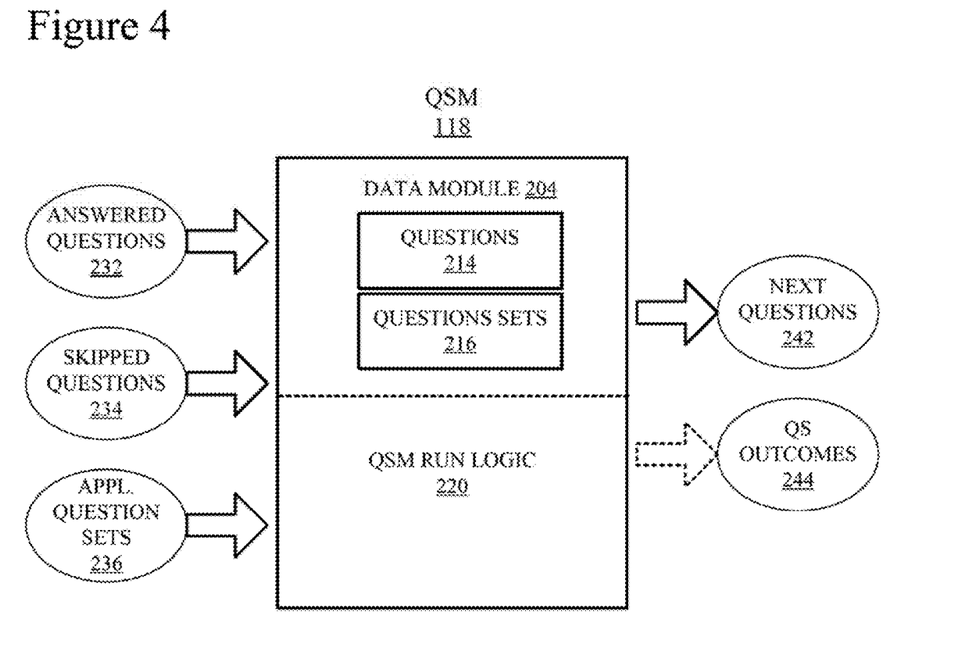
FIG. 4 is a block diagram illustrating high-level operation of the QSM.

FIG. 4 is a block diagram illustrating high-level operation of QSM 118. QSM run logic 220 (FIG. 3) processes answered questions 232, skipped questions 234 and applicable (appl.) question sets 236 to produce next questions 242 and potentially question set (QS) outcomes 244 if all conditions of a particular rule have been satisfied. To perform these functions, QSM 118 has access to data module 204 (FIG. 3) and questions 214 (FIG. 3) and question sets 216 (FIG. 3) stored within data module 204. Although not shown next questions 242 are stored in conjunction with candidate questions 218 (FIG. 3) of data module 204.

Figure 5:
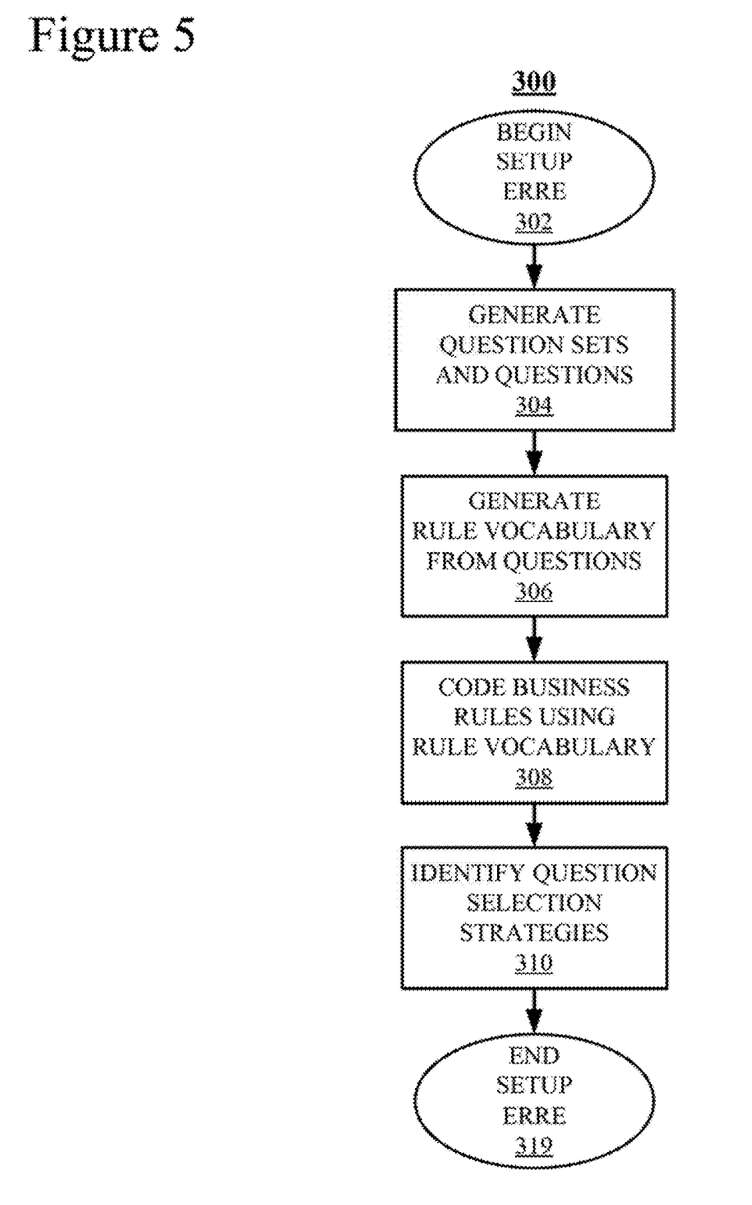
FIG. 5 is a flowchart of one example of a Setup ERRE process that may implement aspects of the claimed subject matter.

FIG. 5 is a flowchart of one example of a Setup ERRE process 300 that may implement aspects of the claimed subject matter. Process 300 is typically implemented by an administrator, programmer or business user in conjunction with the initial setup of ERRE 117 (FIGS. 1 and 2).

Process 300 starts in a "Begin Setup ERRE" block 302 and proceeds immediately to a "Generate Question Sets and Questions" block 304. During block 304, each individual condition (not shown) of conditions 151-153 typically forms the basis of a question stored in questions 214 (FIG. 3). In addition, questions are organized into question sets 216 (FIG. 2) based upon each questions relevance to a particular business problem. Questions and question sets may be built using decision tables typically found in current Business Rules Management Systems (BRMSs). It should be understood that any particular question may be relevant to multiple question sets 216 and rules 141-143. For example, a question about payment type might be relevant to question sets related to both a purchase of a product and the processing of a refund.

During processing associated with a "Generate Rule Vocabulary From Questions" block 306, business object methods are built for request facade 206 (FIG. 3). Business object methods correspond to the questions and are verbalizations of the methods so that they may be used as the vocabulary for writing business rules. For example, a 'getPurchaseAmount' method that returns the answer to question Q2, "What was amount of purchase?" described above in the input data may be defined in request facade 206. In addition, 'getPurchaseAmount' method may be associated with a suitable business verbalization, such as "the purchase amount," for use in rules by business users. It is preferable to automate this process, although it is also possible for a programmer to manually generate the rule vocabulary from Questions 214 (FIG. 3).

During processing associated with a "Code Business Rules Using Rule Vocabulary" block 308, business users or programmers generate business rules by employing the verbalizations generated during processing associated with block 306. During processing associated with an "Identify Question Selection Strategies" block 310, business users or programmers generate business election strategies and overrides using the business rules generated during processing associated with block 310. Finally, control proceeds to an "End Setup ERRE" block 319 in which process 300 is complete.

Figure 6:
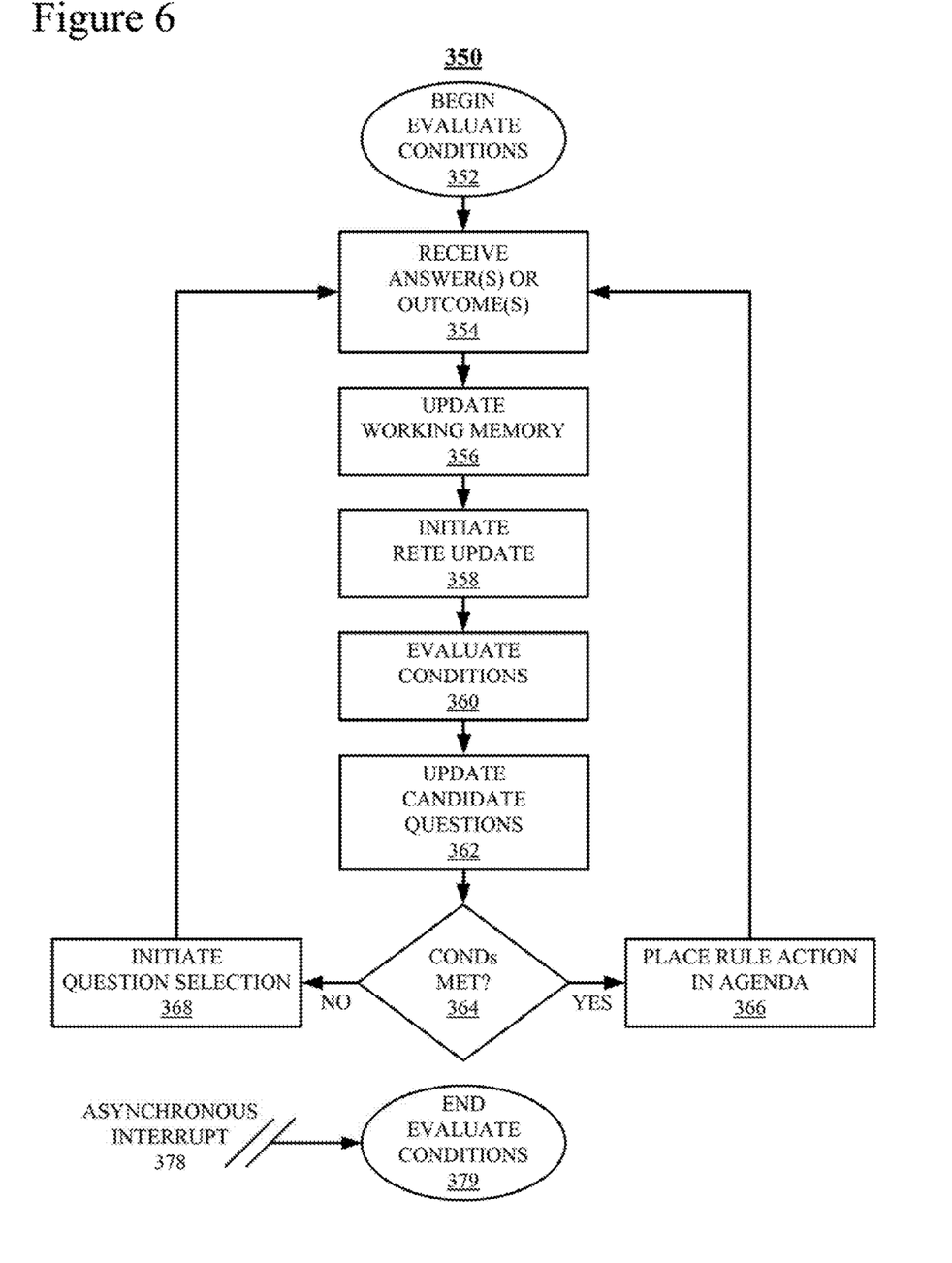
FIG. 6 is a flowchart of one example of an Evaluate Conditions process that may implement aspects of the claimed subject matter.

FIG. 6 is a flowchart of one example of an Evaluate Conditions process 350 that may implement aspects of the claimed subject matter. In this example, logic associated with process 350 is stored on CRSM 112 (FIG. 1) as part of EIDS 116 (FIGS. 1 and 2) and executed on one of more processors (not shown) of CPU 104. The selection of an initial question or questions depends upon an determination of the relevant question set 214 and defined question selection strategies (see 310, FIG. 5).

Process 350 starts in a "Begin Evaluate Conditions" block 352 and proceeds immediately to a "Receive Answer(s) or Outcome(s)" block 354. During processing associated with block 354, EIDS 116 receives an answer to a question or questions presented to a user that have been transmitted by rule client 136 (FIG. 1). It should be understood that multiple questions may be asked at a time and that potential replies might include an relevant answer or the answer may be incomplete or skipped.

During processing associated with an "Update Working Memory" block 356, ERRE 117 (FIGS. 1 and 2) is instantiated an working memory 170 (FIG. 2) is updated with objects such as objects 171 and 172 (FIG. 2) based upon the answer or answers received. In other words, working memory 170 stores a current state of information relating to the ongoing EIDS session. During processing associated with an "Initiate Rete Update" block 358, ERRE 117 processes the answer or answers with respect to ruleset 140 (FIG. 2) in a typical Rete fashion.

During processing associated with an "Evaluate Conditions" block 360, objects 171 and 172 are correlated to conditions 151-153 (FIG. 2) of rules 141-143 (FIG. 2) to potentially produce matches 191-192 (FIG. 2), which may or may not result in the placement of actions such as actions 181 and 182 (FIG. 2) into agenda 180 (FIG. 2). During processing associated with an "Update Candidate Questions" block 362, each time a match between a question and a condition is identified one or more candidate questions may be identified. For example, a determination that a purchase price was over a threshold amount may lead to additional questions concerning payment type while, in contrast a low purchase price may lead to an automatic refund. Identified questions, or a reference to identified question or questions, are stored in candidate questions 218 (FIG. 3). In addition, information relating a reference count and to any weight assigned to a question or corresponding question set are stored in conjunction with each question.

During processing associated with a "Conditions (Cond.) Met?" block 364, a determination is made as to whether or not all individual condition associated with any of rules 141-143 have been met. If so, control proceeds to a "Place Rule Action in Agenda" block 366. During processing associated with block 366, the action 161-163 corresponding to the conditions 151-153 that have been met are placed in agenda 170 for implementation and processed in accordance with standard action procedures.

If, during processing associated with block 364, a determination is made that no conditions 151-153 have been successfully completed, control proceeds to an "Initiate Question Selection" block 368. During processing associated with block 368, a question selection procedure is initiated (see 400, FIG. 7). Once a rule has been placed in agenda 170 during processing associated with block 366 or a question selection process has been initiated during processing associated with block 368, control returns to block 354 and process 350 waits for the next question or outcome to be received and processing continues as describe above.

In the manner described above, question selection becomes a byproduct of standard Rete processing rather than a completely separate process. Finally, process 350 is halted by means of an interrupt 378, which passes control to an "End Evaluate Conditions" block 379 and process 350 is complete. Interrupt 378 is typically generated when OS 114 (FIG. 1), EIDS 116 or computing system 102 is halted. During normal operation, process 350 continuously loops through the blocks 354, 356, 358, 360, 362, 364, 366 and 368, processing answers and outcomes as transmitted by rule client 136.

Figure 7:
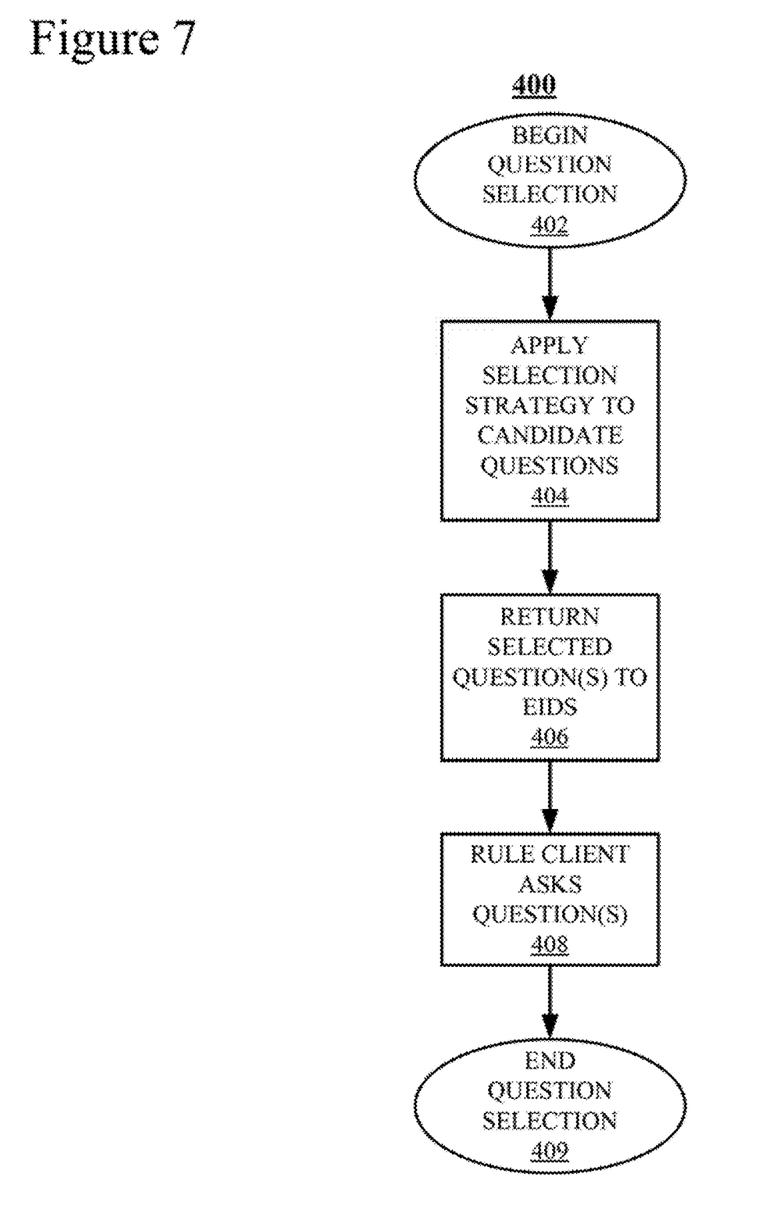
FIG. 7 is a flowchart of one example of a Select Questions process that may implement aspects of the claimed subject matter.

FIG. 7 is a flowchart of one example of a Question Selection process 400 that may implement aspects of the claimed subject matter. Like process 350, in this example, logic associated with process 400 is stored on CRSM 112 (FIG. 1) and executed on one of more processors (not shown) of CPU 104. In addition, process 400 is associated with QSM 118 (FIGS. 1-4).

Process 400 starts in a "Begin Question Selection" block 402 and proceeds immediately to an "Apply Selection Strategy to Candidate Questions" block 404. During processing associated with block 404, reference counts and weights associated with questions collected during processing associated with the evaluation of conditions (see 350, FIG. 6) are processed to determine a next question or questions to be asked. The specific manner in which weights and reference counts employed to make such a determination are based upon operating parameters 224 (FIG. 3) and the established rules and policies associated with question selection strategies (see 310, FIG. 5).

During processing associated with a "Return Selected Question(s) to EIDS" block 406, the question or questions selected during processing associated with block 404 are returned to EIDS 117 (FIGS. 1 and 2) for transmittal to rule client 136 (FIG. 1). During processing associated with a "Rule Client Asks Questions" block 408, the question or questions transmitted to rule client 136 are presented to a user and, when an answer is received, the answer is processed in accordance with the procedures described above (see 350, FIG. 6). Finally, control proceeds to an "End Question Selection" block 409 during which process 400 is complete.

Figure 8:
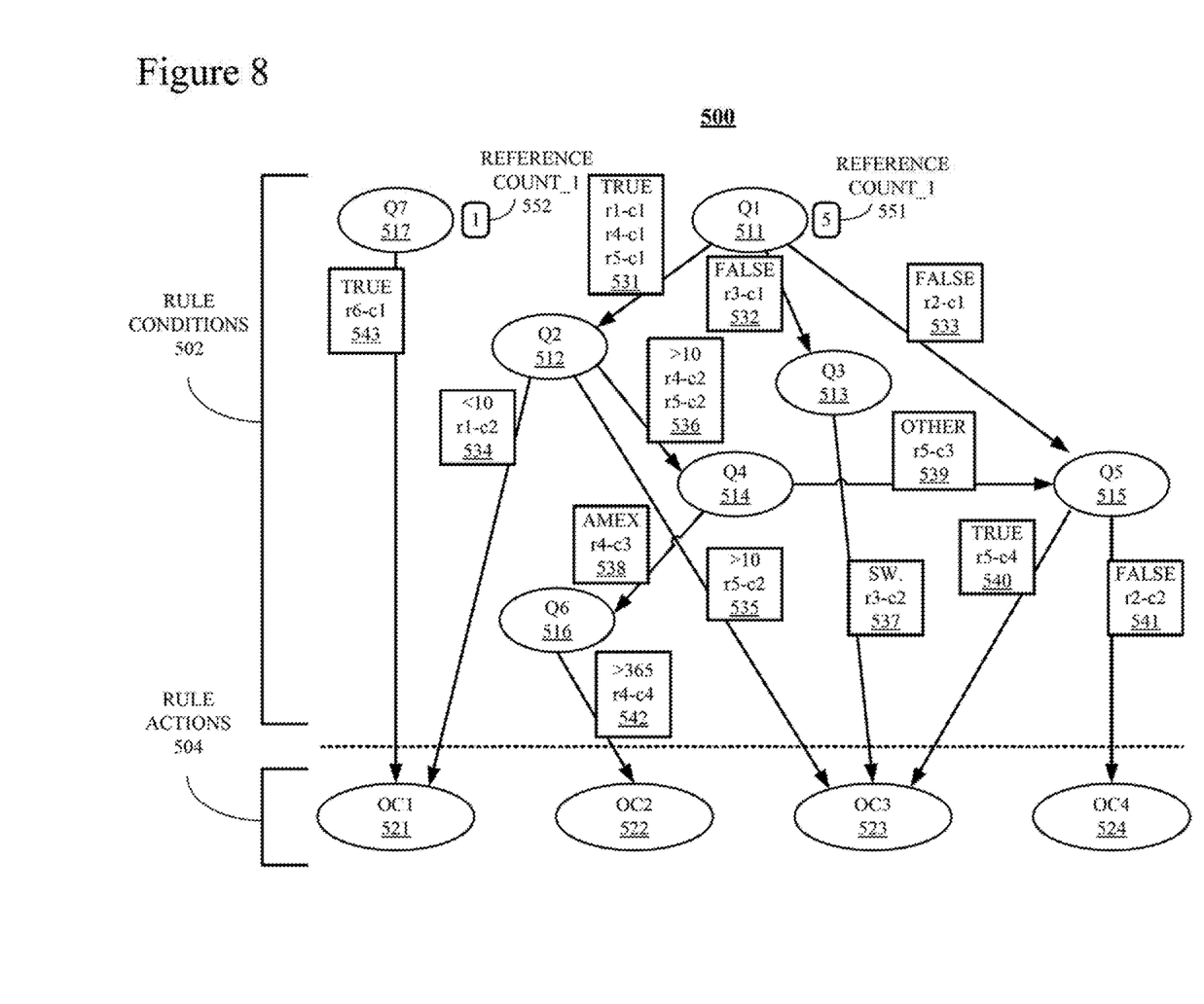
FIG. 8 is an example of a decision graph in accordance with the disclosed technology, including references counts.

FIG. 8 is an example of a decision graph 500 in accordance with the disclosed technology. Consider the following set of rules for governing refund requests. Note that these rules are simplified for illustration purposes, with each having one or more conditions and a single action.

RULE 1: If customer has proof of purchase and the purchase amount is less than $10,
then set outcome to APPROVE.
RULE 2: If customer does not have proof of purchase and the payment type is DINERS,
then set outcome to WRITE_OFF.
RULE 3: If customer does not have proof of purchase and the product type is SWIMWEAR
then set outcome to DENY RULE 4: If customer has proof of purchase and the refund amount is at least $10 and payment type is AMEX
then set outcome to PEND
RULE 5: If customer has proof of purchase and the refund amount is at least $10 and payment type is OTHER
then set outcome to DENY
RULE 6: If it is the customer's birthday
then set outcome to APPROVE Rules 1-6 may be represented by a directed acyclic decision graph such as graph 500. Decision graph 500 is divided into two (2) sections, i.e., rule conditions 502 and rule actions 504. Within rule conditions 502 are a number of questions, i.e., a first question, or "Q1," 511, a second question, or "Q2," 512, a third question, or "Q3," 513, a fourth question, or "Q4," 514, a fifth question, or "Q5," 515, a sixth question, or "Q6," 516 and a seventh question, or "Q7," 517. In this example, Q1-7 511-517 correspond to questions 1-7 detailed above in conjunction with FIG. 3. Within rule actions 504, are example of four (4) possible outcomes, or "OCs," i.e., an OC1 521, an OC2 522, an OC3 523 and an OC4 524. In the following example, OC1 521 corresponds to an "APPROVE," OC2 522 to "PENDING," OC3 523 to "DENY" and OC4 to "WRITE_OFF," all of which should be self-explanatory.

Depending upon the answers to any particular question Q1-7 511-517, there may be several possible outcomes. For example Q1 511, which has a "TRUE/FALSE" answer, may be relevant to Q2 512, Q3 513 and Q5 515. These relevancies between Q1 511 and Q2 512, Q3 513 and Q5 515 are represented in FIG. 8 by arrows that point from Q1 511 to Q2 512, Q3 513 and Q5 515. In a similar fashion, answers to Q2-Q7 512-517 are indicated as relevant to either other questions or OC1-4 521-524.

Each of the arrows representing relevancies, corresponding to a label that details the corresponding answer to the source of the arrow and conditions associated with the destination question. In other words, each question 511-517 may be associated with multiple Condition/Action pairs. Specifically, the arrow between Q1 511 and Q2 512 corresponds to a label 531 that indicates an answer to Q1 511 of "TRUE" and that the "TRUE" answer to Q2 512 may be an answer to rule 1, condition 1, or "r1-c1," rule4, Condition1, or "r4-c1" and rule 5, condition 1, or "r5-c1." For the sake of convenience, rule condition pairs will be referred to with the notation "r#-c#" throughout the rest of the Specification.

An answer of "FALSE" to Q1 511 may indicate a need to present Q3 513 or Q5 515, associated with labels 532 and 533, respectively. In a similar fashion, an answer of "<10" to Q2 512 corresponds to r1-c2 as indicated by a label 534, leading to OC1 521. An answer of ">10" corresponds to r5-c2 as indicated by a label 535 and leading to OC3 523 and r4-c2 and r5-c2 as indicated by a label 536 and indicate a need to ask question Q4 514. An answer of "Swimwear," or "SW," to Q3 513 corresponds to r3-c2 as indicated by a label 537 and leads to OC3 523. An answer of "AMEX" to Q4 514 corresponds to r4-c3 as indicated by a label 538, which indicates a need to ask Q6 516. Any other answer to Q4 514 corresponds to r5-c3 as indicated by a label 539, which indicates a need to ask Q5 515. An answer of "TRUE" to Q5 515 corresponds to r5-c4 as indicated by a label 540 and leads to OC3 523. An answer of "FALSE" to Q5 515 corresponds to r2-c2 as indicated by a label 541 and leads to OC4 524. An answer of ">65" to Q6 515 corresponds to r4-c4 as indicated by a label 542 and leads to OC2 522. Finally, an answer of "TRUE" to Q7 517 corresponds to r6-c1 as indicated by a label 543 and leads to OC1 521.

It should be noted that there may be questions that are skipped or answered with a response that does not correspond to any of the labels 531-543. In such a case, the disclosed technology merely returns to a question selection based upon the information that is available without any need to program or establish every special or unusual scenario. Each candidate question corresponding to questions 511-517 is also associated with a reference count, of which for the same of simplicity only two (2) are shown, i.e., a reference count_1 551 and a reference count_2 552. In this example, reference counts such as counts 551 and 552 are based upon a number of r#-C# pairs with which a particular question is associated.

ERRE 117 traverses to a node of graph 500 when all precursor conditions have been satisfied. To start, when no answers have not yet been supplied, decision graph 500 reference count_1 551 is equal to '5' because of r1-c1, r4-c1 and r5-c1 in label 531, r3-c1 in label 532 and r2-c1 in label 533. Reference count 552 is equal to '1' because the only r#-c# pair associated with Q7 517 is r6-c1 in label 543. The reference count of all other nodes is equal to '0' until either Q1 of Q5 has been answered. It should be noted that a reference count is not determined by a static analysis of rules but rather, during rule processing, candidate tracker 208 (FIG. 3) updates reference counts based upon the number of times a question is referenced by ERRE 117 (FIGS. 1 and 2). Reference counts may be employed to determine a next question or questions to ask because they indicate the number of potential conditions that may be met by any particular answer and, potentially, a quicker path to an outcome such as OCs 521-514. During Rete pattern matching of the 6 business rules R1-R6, i.e. during the traversal of decision graph 500, Candidate Tracker 208 accumulates the candidate questions and calculates their dynamic properties (reference count and ordinal ranking). If no rule is fired, or no outcome is reached, then the QSL 210 generates the next question from these candidates based on the user-specified selection strategy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. A method, comprising;
    generating a plurality of questions for an interactive decision service, each question based upon one or more conditions of a plurality of conditions, wherein the plurality of conditions are associated with a plurality of business rules;
    identifying, as a side effect of evaluating, by a forward changing rule engine, the plurality of business rules for missing information corresponding to the plurality of questions, wherein the missing information has not been previously requested from a user; and
    selecting, for presentation to the user, a first question of the plurality of questions to elicit the missing information from the user.

2. The method. of claim 1, further comprising:
    generating, for each question of the plurality of questions a corresponding reference count and ordinal ranking; and
    identifying candidate questions from the plurality of questions; based upon the corresponding reference counts and ordinal rankings; wherein. the first question is selected from the candidate questions.

3. The method of claim 2, further comprising assigning to each question of the plurality of questions, a corresponding weight, wherein the candidate questions are, in addition to reference counts and ordinal rankings, also identified based upon the corresponding weights.

4. The method of claim 2, wherein each reference count corresponding to the plurality of questions is based upon a number of times the forward chaining rule engine references the corresponding question during pattern matching.

5. The method of claim 1, wherein the forward chaining rule engine employs a Rete algorithm for evaluating the plurality of business rules.

6. The method of claim 1, wherein the interactive decision service is associated with an interactive voice response system.

7. The method of claim 1, wherein the interactive decision service is associated with a sell-service kiosk.

* * * * *